United States Patent [19]
White

[11] Patent Number: 4,712,578
[45] Date of Patent: Dec. 15, 1987

[54] FLUID MANIFOLD SYSTEM

[75] Inventor: Allan E. White, Hightstown, N.J.

[73] Assignee: RCA Corporation, Princeton, N.J.

[21] Appl. No.: 853,430

[22] Filed: Apr. 18, 1986

[51] Int. Cl.$^4$ .............................................. F17D 1/08
[52] U.S. Cl. ..................... 137/271; 137/269; 137/561 A
[58] Field of Search ............... 137/269, 271, 561 A, 137/884; 251/216

[56] References Cited

U.S. PATENT DOCUMENTS

| | | | |
|---|---|---|---|
| 2,006,865 | 7/1935 | Lake | 251/216 X |
| 2,652,069 | 9/1953 | Goheen | 137/271 |
| 2,834,368 | 5/1958 | Gray | 137/271 |
| 3,175,578 | 3/1965 | Patterson et al. | 137/561 A |
| 3,506,029 | 4/1970 | Demler, Sr. et al. | 137/561 |
| 3,548,849 | 12/1970 | Purcell et al. | 137/81.5 |
| 3,765,441 | 10/1973 | Chang | 137/271 |
| 3,974,856 | 8/1976 | Lancier | 137/271 X |
| 4,080,983 | 3/1978 | Stumpmeier | 137/271 |

Primary Examiner—Alan Cohan
Assistant Examiner—John Rivell
Attorney, Agent, or Firm—Allen L. Limberg; William Squire

[57] ABSTRACT

An elongated body contains a central threaded bore in communication with opposite body ends. A plurality of transverse threaded bores of the same thread size are formed in the body at spaced locations along the longitudinal axis of the body in communication with the threaded bore. Set screws mate with the central and transverse bores for sealing those bores at selected locations to form the body into one or more manifold chambers. Fluid fittings mate with the central and transverse bores for selectively coupling the so formed chambers to one or more external fluid systems.

13 Claims, 5 Drawing Figures

FLUID MANIFOLD SYSTEM

This invention relates to a device useful in fluid circuits and, more particularly, to a device for branching fluids from and to a plurality of passages.

In U.S. Pat. No. 3,765,441 an input manifold, comprising M input connectors with each of which N discrete ports communicate, is assembled in stacked relationship. An output manifold comprises N output connectors with each of which M discrete ports communicate. Each manifold thus comprises a matrix of MN paired, aligned ports, wherein M may or may not be equal to N. A program gasket is sandwiched between the input and output manifolds and has holes in selected locations for coupling respective input and output ports of preselected input and output pairs from each other. A separate gasket is required for each particular specified program matrix of MN paired ports. This is a relatively complex system requiring a specific gasket design for use with a specific matrix of ports.

In U.S. Pat. No. 4,080,983 a valve base for connecting hydraulic valves to hydraulic circuits comprises a base having in a number of coplanar and longitudinal channels groups of holes. The holes are in a standardized pattern to fit a standardized pattern connection of a hydraulic valve. A transverse bore is associated with each group of holes and intersects all of the longitudinal channels. Each transverse bore contains a column of distributor modules held by terminal members at the end of the bore. The distributor modules are of different types of hollow cylinders and are separated by discs which may be solid or annular to permit flow along a bore. This module may have one or two lateral openings, or a circumferential groove in its external surface to provide a choice of connections. A number of differently configured inserts are thus required to be stocked by a user for providing a given system function. In addition to inserts, seal rings and other components need to be included in the system such as discs and so forth to take advantage of the system flexibility. The use of many different kinds of components can be costly.

U.S. Pat. No. 3,506,029 discloses a manifold for use with fluid carrying lines which comprises manifold sections each including latch means on each end to join the manifold sections to form a manifold of a desired length. Sealing means are provided between each of the manifold sections to provide a fluid tight seal therebetween. Cap means are provided on the outermost ends of the end manifold sections. The manifold sections are connected to a source of fluid supply and remaining ones of the manifold sections are connected to fluid carrying lines. This system requires assembly of subassemblies and stocking a large number of such subassemblies in order to achieve a given manifold function. The stocking of a relatively large number of manifold subsections can be costly.

U.S. Pat. No. 2,834,368 discloses a multiple valve assembly including a valve fitting which in a single form is capable of receiving a plurality of different valves necessary in a hydraulic circuit. A single form of a valve fitting enables a selected number of fittings to be arranged in juxtaposition into a unitary assembly to embody the desired valve functions of the system. However, this manifold body of the valve assembly comprises a single manifold chamber which is connectible by plugs or coupling conduits to other like manifold chambers. This is somewhat similar to U.S. Pat. No. 3,506,029 in that a user is required to inventory a large number of manifold subsections in order to achieve a multiple manifold system.

A fluid manifold according to the present invention comprises a body and a threaded first conduit having threads of a first given thread size, the conduit and threads extending into the body in communication with at least one exterior body surface. A plurality of threaded second conduits of a second given thread size are each in an exterior body surface in communication with the first conduit and are spaced along the length of the first conduit. At least one threaded first element is adapted to mate with the first conduit threads to block the flow of fluid through the first conduit. At least one threaded fluid coupling element is adapted to mate with a selected one of the first and second conduits to fluid couple the first conduit in communication therewith to a region external the body. Thus, elements having threads which match the first and second thread sizes are interchangeable with the respective first and second conduits to customize a manifold to a given need.

Figure 1:
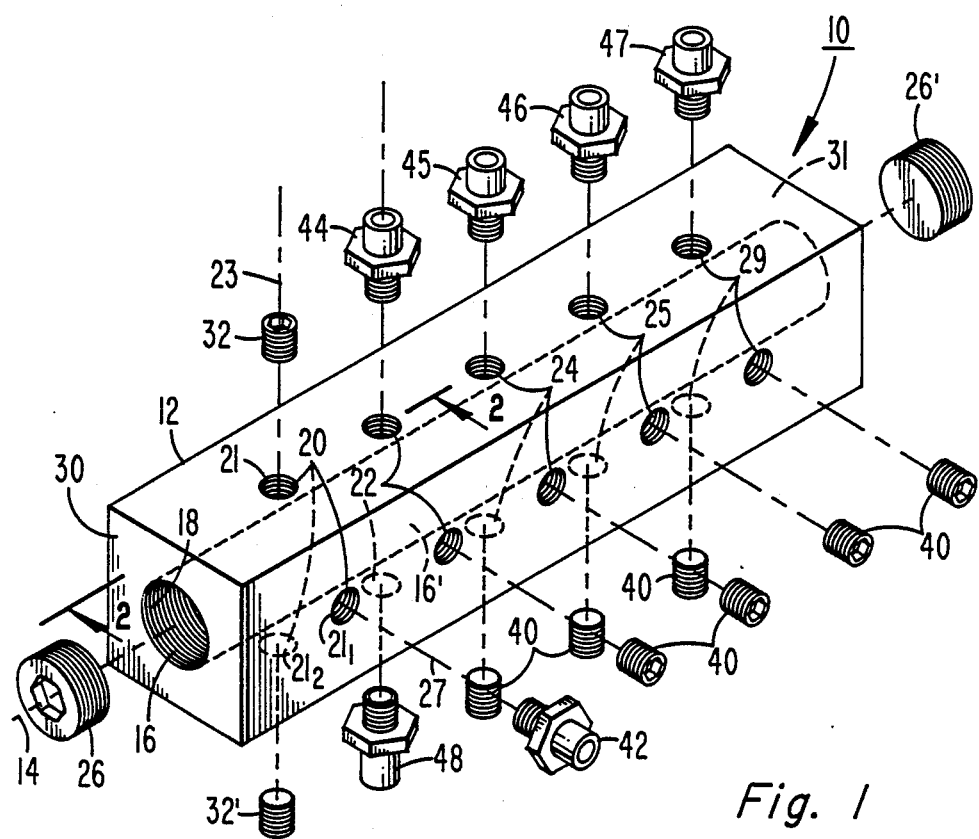
FIG. 1 is an isometric exploded view of a fluid manifold in accordance with one embodiment of the present invention.

In FIG. 1, manifold 10 includes an elongated body 12, which may be of metal or molded thermoplastic material, having a longitudinal axis 14 and a longitudinal threaded bore 16 of a given diameter, for example, one inch, having threads 18 of a given thread size. The threads 18 are continuous through body 12 and are aligned on axis 14. In the alternative, the bore 16 may extend into the body 12 from one end and terminate prior to communicating with the other end. Spaced along axis 14 are a plurality of sets 20, 22, 24, and so on of transverse threaded bores. Each set, for example, set 20 are coplanar and lie in a plane normal to axis 14. Each transverse bore of the sets 20, 22, 24, and so on, is preferably smaller in diameter than bore 16, for example, ¼ inch, and has a longitudinal axis which is perpendicular to axis 14. For example, bore 21 has an axis 23 normal to axis 14. Bore 21$_2$ of set 20 is aligned on axis 23. Bore 21 of set 20 has an axis 27 normal to axes 23 and 14. The threads of all of the transverse bores are identical. The bore set 20 preferably lies in a given plane so that its bores are in communication with the same portion of the chamber formed by bore 16. Similarly, the transverse bores of set 22 are aligned in a plane normal to axis 14 and are in communication with a second different portion of the chamber formed by bore 16, and so on, for the remaining transverse bore sets. While three transverse bores are illustrated in a given set, a set may, in practice, comprise fewer or more bores.

Figure 3:
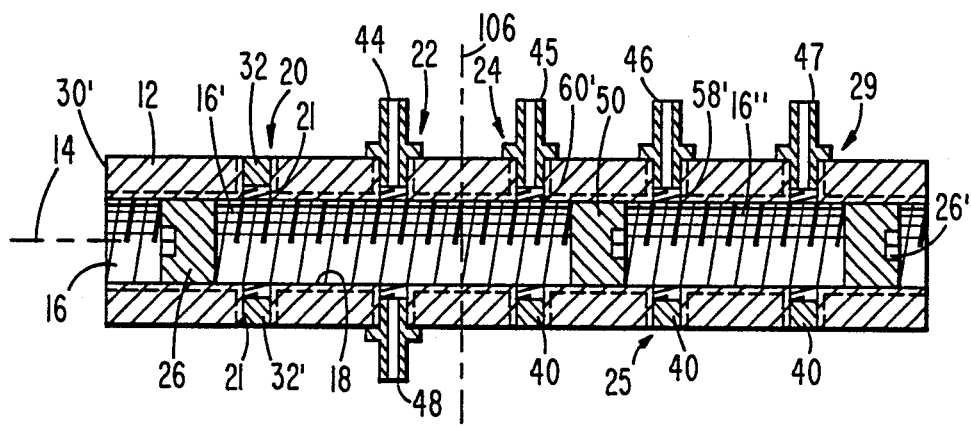
FIG. 3 is a longitudinal elevation sectional view of the embodiment of FIG. 1.

In FIG. 1, identical solid set screws 26 and 26' mate with the threads 18 of bore 16 at opposite respective ends 30 and 31 of body 12. Parts in the different figures with the same primed and unprimed reference numerals are identical. Bore set screw 26, FIG. 3, is in the region of bore 16 between transverse bore sets 20 and the body 12 end 30. Bore set screw 26' is in the region of bore 16 between transverse bore sets 29 and end 31. Set screw 26 seals the chamber formed by bore 16 adjacent transverse bore set 20 from the end 30 of body 12. Set screw 26' seals the chamber formed by bore 16 adjacent bore set 29 from end 31.

Figure 2:
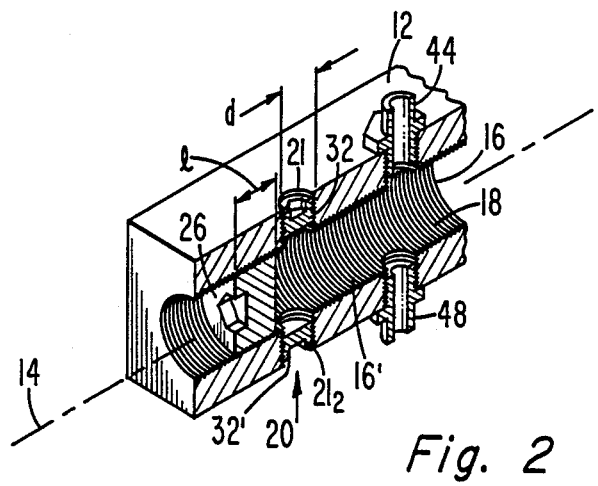
FIG. 2 is an isometric view of a section of the assembled embodiment of FIG. 1 taken along lines 2—2.

A plurality of solid identical set screws, for example, set screws 32 and 32', mate with corresponding ones of threaded transverse bores 21 and 21₂ of bore set 20 to seal those bores and, therefore, the internal threaded bore 16 chamber at that region from the ambient atmosphere. In the alternative to set screws, a standard screw plug, i.e., a threaded plug with an elastomeric sealing washer, could also be used. Set screws 40 are identical to screws 32 and 32' and are secured to selected ones of the remaining transverse bores of sets 22, 24, and so forth, sealing those bores from the ambient atmosphere. Threaded fluid coupling fitting 42 whose threads match the threads of the transverse bores is threaded to bore 21₁ of set 20 to couple bore 16 chamber 16', FIG. 2, within body 12 at bore set 20 to an external fluid system (not shown) via a fluid line (not shown) coupled to fitting 42. Such an external system could include, for example, a second manifold system including a body such as body 12 and a set of fittings and set screws secured to that body. Fluid coupling fittings 44–48 inclusive, identical to fitting 42, are each coupled to a different one of the remaining transverse bores. Thus, bore 16 is sealed from the ambient atmosphere notwithstanding the presence of fittings 42, 44–48, which are fluid coupled by fluid lines (not shown) to the external fluid system (not shown).

Any number of set screws identical to screws 26 and 26' may be used to divide the bore 16 into a plurality of fluid isolated chambers. For example, in FIG. 3, bore 16 is divided into two chambers 16' and 16" by bore set screws 26, 26', and 50. Set screw 50 is between transverse bore sets 24 and 25. Set screws 26 and 50 form bore 16 chamber 16' and set screws 50 and 26' form chamber 16". All of the bore set screws adapted to mate with bore 16 are identical and are standard. Fittings 42, 44–48, which also are commercially standard, are used to couple corresponding mating chambers 16' and 16" to one or more external fluid systems (not shown) via fluid lines (not shown). All of the fittings are identical.

In FIG. 3, while only one internal bore set screw 50 is illustrated for dividing the body 12 into the two chambers 16 and 16", it should be understood that a solid set screw may be inserted between any selected pair of aligned coplanar transverse bore sets for further dividing chamber 16 into additional chambers. For example, a bore set screw (not shown) may be disposed between bore sets 25 and 29 or between bore sets 22 and 24. In this case, fitting 47 would be coupled to a chamber isolated from the chamber coupled to by fitting 46. Fittings 44 and 48 would be coupled to the same isolated chamber. Of course, other fitting arrangements may be used. The above is by way of example to illustrate the flexibility of the manifold using identical set screws for dividing the bore 16 into multiple chambers. If necessary, a thread sealant may be added to the threads of each set screw or fitting at a given location along chamber 16 or at each transverse bore for enhancing the sealing action.

In addition, screws which mate with bore 16 may have a length dimension parallel to axis 14 greater than the diameter of the transverse bores. Here, such a set screw when aligned juxtaposed with a transverse bore set extends beyond each bore of that set along axis 14 and can thus seal those bores without the use of the mating smaller screws such as screws 40. For example, in FIG. 2, screw 26 can have a length l greater than the diameter d of transverse bore 21. When screw 26 is aligned centrally on axis 23, screw 26 overlaps bores 21, 21₂ (and 21₁, FIG. 1) into the threads of bore 16 an amount to contact and seal the threads of bore 16 on either side of the bore set 20. Screw 26 length l is also less than the spacing between adjacent transverse bore sets.

Figure 4:
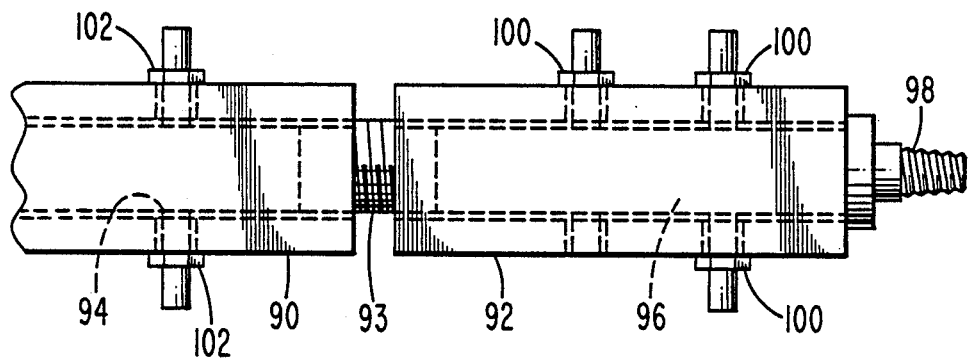
FIG. 4 is an elevation side view of a second embodiment incorporating several manifolds of FIG. 1.

In FIG. 4, two bodies 90 and 92, identical to body 12, FIG. 1, are coupled by a hollow pipe-like threaded fluid coupler 93 which mates with internal threaded bores 94 and 96 of the respective bodies 90 and 92. A second different fluid hose coupler nipple 98 is threaded to the end of bore 96 for coupling bores 94 and 96 to an external fluid system via a fluid line (not shown). In addition, fluid fittings 100 are coupled to selected ones of the body 92 transverse bores and fittings 102 are coupled to the body 90 transverse bores for coupling the interior manifold formed by bores 94 and 96 to one or more external fluid systems. The remaining transverse bores (not shown) in bodies 92 and 90 are plugged with solid set screws. Additional manifold bodies (not shown) may be axially fluid coupled to body 90 in serial fashion along the axis of bores 94 and 96 or by fluid couplers and connecting lines connected to the transverse bores. Also, coupler 93 can have a length greater than the diameter of the transverse bores for sealing those transverse bores aligned therewith without blocking the bore 94 or 96 in which it is located.

To reduce the size of the manifold, a manifold body, for example, body 12, FIG. 3, may be severed between a set of aligned transverse bores, for example, in a plane 106, to divide the body 12 into two smaller manifolds. Because the longitudinal axially extending threads in the manifold bodies are identical, and the threads of the transverse smaller bores are also identical, such severing of the manifold body 12 at any location between a given set of transverse bore sets easily forms the single manifold body into a plurality of smaller manifolds without further processing. The same fittings and set screws are used to plug the transverse bores or couple the severed interior main bore 16 to external fluid systems, as desired. Also, a manifold body can have any length and any number of transverse spaced bores along that length.

Figure 5:
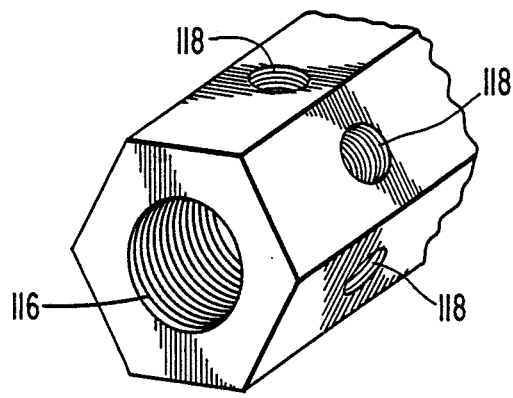
FIG. 5 is an isometric view of a portion of a manifold in accordance with a second embodiment.

In FIG. 5, a hexagonal shaped body has an internal threaded bore 116 and a plurality of like transverse aligned bores 118. A bore 118 is in each facet of the hexagonal side of the body. Not shown in FIG. 5 are additional sets of transverse bores 118 spaced along the longitudinal axis of bore 116 similarly as the transverse bore sets of the manifold system of FIG. 1. One or more transverse bores may be formed in the manifold, as desired, at a given longitudinal location along the manifold longitudinal axis, such as axis 14. However, the greater number of transverse bores that are aligned in a given region of bore 16, the greater the flexibility of the manifold. While the transverse bore sets have been illustrated as coplanar, by way of example, it should be understood that they need not be coplanar. Such aligned bores need only communicate with a given chamber portion of bore 16 so as to be in fluid communication with that chamber portion. Such a chamber portion would be formed by a bore set screw, such as screw 26, FIG. 1, on each side of a transverse bore set.

The manifold described herein may be used in pneumatic or hydraulic systems. The important feature is that the manifold is relatively low cost, incorporates relatively few different fittings and plugs, and the fittings and plugs are interchangeable regardless manifold size and are commercially available in standard off-the-shelf dimensions. While only a few combinations of fittings and coupling elements and plug-like set screws have been illustrated herein, it is to be understood that the manifold system may embody any permutation and combination of such or similar threaded elements in accordance with a given implementation.

What is claimed is:

1. A fluid manifold comprising:
   a body;
   a threaded first conduit having threads of a first given thread size, said conduit and threads extending into the body a given length in communication with at least one exterior body surface;
   a plurality of threaded second conduits of a second given thread size, each in an exterior body surface in communication with the first conduit and spaced along the threaded length of the first conduit;
   a plurality of threaded first elements adapted to mate with the first conduit threads to block the flow of fluid through the first conduit; and
   at least one threaded second fluid coupling element adapted to mate with a selected one of said first and second conduits to fluid couple the first conduit in communication therewith to a region external to the body;
   said first elements being positioned and spaced in said first conduit to divide said first conduit into at least two separate chambers.

2. The manifold of claim 1 further including at least two of said bodies, said at least one second threaded element adapted to mate with a selected one of the threads of said first and second conduits of each said bodies for fluid coupling the first conduits of said at least two bodies.

3. The manifold of claim 1 wherein a plurality of at least a pair of said second conduits are adjacent a corresponding separate given plane normal to the first conduit for communication with substantially the same portion of said first conduit.

4. The manifold of claim 1 wherein said first conduit has a diameter larger than the diameter of said second conduits.

5. The manifold of claim 1 further including a third element adapted to mate with the first conduit and having a length greater than the diameter of the second conduits for fluid sealing said second conduit juxtaposed therewith from said first conduit.

6. The manifold of claim 1 wherein the first conduit extends through the body in communication with opposite exterior body surfaces.

7. The manifold of claim 1 further including at least one threaded third element adapted to mate with a selected second conduit to block the flow of fluid through that selected second conduit.

8. The manifold of claim 1 wherein each of said first elements is dimensioned smaller in length than the spacing between the second conduits in a direction along the first conduit length.

9. A fluid manifold comprising:
   a body having a longitudinal axis, said body having a longitudinal threaded bore extending parallel to said axis in communication with at least one end of said body;
   a plurality of threaded transverse bores oriented with their thread axes normal to said longitudinal axis, said transverse bores being spaced from each other on said body in a direction parallel to said longitudinal axis, at least one transverse bore being positioned at a given plane normal to said longitudinal axis corresponding to each said transverse bores;
   at least one threaded first element adapted to mate with said longitudinal bore thread for selectively fluid sealing the longitudinal bore thereat at any desired location within that bore to form that bore into at least one chamber; and
   at least one threaded third element adapted to mate with a selected one of said longitudinal and transverse bores for fluid coupling the longitudinal bore thereat to a region external said body;
   the spacing of said transverse bores in said direction parallel to said longitudinal axis being greater than the length of said first element in that direction.

10. The manifold of claim 9 further including at least two said bodies, said bodies having like threaded bores, and further including a threaded fourth element adapted to mate with the like longitudinal bores of said at least two bodies for fluid coupling said longitudinal bores.

11. The manifold of claim 9 wherein said first element has a length greater than the diameter of said transverse bores for sealing selected ones of said transverse bores from said longitudinal bore when aligned with said selected ones of said transverse bores.

12. The manifold of claim 9 wherein said transverse bores are identical.

13. The manifold of claim 9 further including at least one second threaded element adapted to mate with a selected transverse bore for selectively fluid sealing that transverse bore.

* * * * *